United States Patent
Zoso et al.

(10) Patent No.: US 7,403,966 B2
(45) Date of Patent: Jul. 22, 2008

(54) HARDWARE FOR PERFORMING AN ARITHMETIC FUNCTION

(75) Inventors: Luciano Zoso, Chandler, AZ (US); Allan P. Chin, Phoenix, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 689 days.

(21) Appl. No.: 10/730,174

(22) Filed: Dec. 8, 2003

(65) Prior Publication Data
US 2005/0125479 A1 Jun. 9, 2005

(51) Int. Cl.
G06F 7/38 (2006.01)
G06F 7/52 (2006.01)
(52) U.S. Cl. .................... 708/606; 708/650
(58) Field of Classification Search ......... 708/605–656, 708/500, 502
See application file for complete search history.

(56) References Cited

U.S. PATENT DOCUMENTS

| | | | | |
|---|---|---|---|---|
| 4,381,550 A | * | 4/1983 | Baker | 708/655 |
| 4,760,550 A | * | 7/1988 | Katzman et al. | 708/504 |
| 4,949,296 A | * | 8/1990 | Malinowski | 708/605 |
| 5,016,210 A | * | 5/1991 | Sprague et al. | 708/655 |
| 5,493,523 A | * | 2/1996 | Huffman | 708/655 |
| 5,517,439 A | * | 5/1996 | Suzuki et al. | 708/655 |
| 6,138,138 A | * | 10/2000 | Ogura | 708/656 |
| 6,163,791 A | * | 12/2000 | Schmookler et al. | 708/502 |
| 6,321,245 B1 | * | 11/2001 | Cukier et al. | 708/650 |
| 6,546,409 B1 | * | 4/2003 | Wong | 708/655 |

OTHER PUBLICATIONS

Johnson, "Algorithm 650: Efficient Square Root Implementation on the 68000," ACM Transactions on Mathematical Software, vol. 13, No. 2, Jun. 1987, pp. 138-151.

* cited by examiner

*Primary Examiner*—Chat C Do
(74) *Attorney, Agent, or Firm*—James L. Clingan, Jr.

(57) ABSTRACT

A circuit for performing an arithmetic function on a number performs the function using successive approximation. Each approximation produces an estimate of the result. A determination of the utility of this estimate is made by comparing the inverse function of a given estimate to the number. The current estimate is updated based on this comparison and the inverse function of the current estimate is stored. The next estimate is an incremental change from the previous estimate and there is a corresponding incremental change in the inverse function from the current estimate to the next estimate. Rather than calculating the whole inverse function, which would typically require a multiplier, only the incremental change in the inverse function is provided simply. The incremental change in the inverse function is then added to the inverse function of the current estimate and compared to the number for determining the utility of the next estimate.

3 Claims, 2 Drawing Sheets

HARDWARE FOR PERFORMING AN ARITHMETIC FUNCTION

FIELD OF THE INVENTION

This invention relates to arithmetic functions, and more particularly, to arithmetic functions implemented in hardware.

RELATED ART

The need for taking the square root of a number comes up in many applications. Use in calculators is one common application. Another is situations in which there needs to be a power measurement. This is typically done by using root mean square (RMS), which inherently requires a square root. Often a microcomputer or another processing unit is available to perform the function. There are other situations, however, where no such processing unit is available. This can be either because it is not present at all due to cost or space considerations or it is being fully utilized for other purposes. In these situations a hardware solution is needed. A known way of taking the square root is to use successive approximation. The square value has a given number of bits which is divided in half to define an integer bit length (N) for the answer. The value of the most significant bit (2 to the N−1) is squared (the other bits are set to zero) and compared to the square value. If the value of the most significant bit squared is greater than the square value then the most significant is set to zero. If, on the other hand, the square value is greater, then the bit is set to one. Then the next most significant bit is set to one, the total value squared and compared to the square value. If the total value squared is greater than the square value, this next most significant bit is set to zero. Otherwise it is set to one. This process continues with all of the N bits. It can continue beyond N bits if the resolution is desired to be more than an integer answer. The total number of iterations determines the resolution.

This is an effective approach but has required at least two cycles per iteration and a multiplier. Multipliers can be made to be fast, but they can also be quite large. When a processing unit is available this process is fairly easy because all of the elements needed are readily available. The number of cycles can be long, however, if the resolution is relatively high. This is compounded by requiring two cycles per iteration.

Similarly, other arithmetic functions such as division have similar issues.

Thus, there is a need to provide a hardware solution for arithmetic functions, particularly a square rooter that is relatively fast but does not require large amounts of space such as that typically required by a multiplier.

BRIEF DESCRIPTION OF THE DRAWINGS

The present invention is illustrated by way of example and not limited by the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF THE DRAWINGS

In one aspect a circuit for performing an arithmetic function on a number performs the function using successive approximation. Each approximation produces an estimate of the result. A determination of the utility of this estimate is made by comparing the inverse function of a given estimate to the number. The current estimate is updated based on this comparison and the inverse function of the current estimate is stored. The next estimate is an incremental change from the previous estimate and there is a corresponding incremental change in the inverse function from the current estimate to the next estimate. Rather than calculating the whole inverse function, which would typically require a multiplier, only the incremental change in the inverse function is provided simply. The incremental change in the inverse function is then added to the inverse function of the current estimate and compared to the number for determining the utility of the next estimate. This is better understood by reference to the drawings and the following description.

Figure 1:
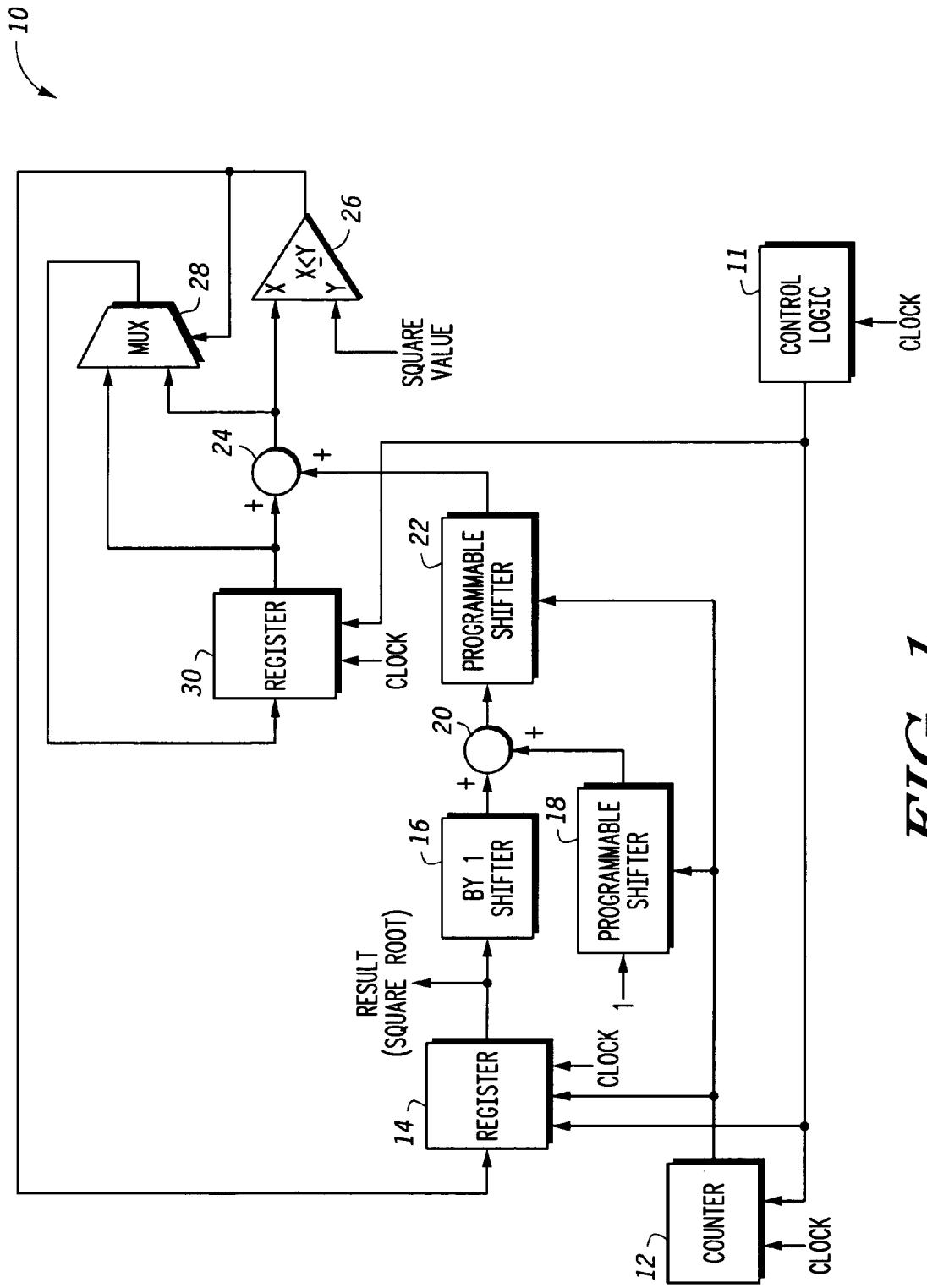
FIG. 1 is a block diagram of a circuit according to a preferred embodiment of the invention.

Shown in FIG. 1 is a square rooter 10 comprising control logic 11, a counter 12, a register 14, a shifter 16, a programmable shifter 18, a summer 20, a programmable shifter 22, a summer 24, a comparator 26, a multiplexer (mux) 28, and a register 30. Control logic 11 has an input for receiving a clock, and an output for providing a reset signal. The control logic provides a time frame for performing the square root function. Counter 12 has a first input for receiving a clock, a second input coupled to the output of the control logic, and an output for providing a count. Counter 12 counts down from a preset amount. Register 14 has a first input, a second input coupled to the output of the control logic, a third input coupled to the output of counter, a fourth input for receiving the clock, and an output. The output of register 14 provides the result of the square root calculation provided by square rooter 10. Shifter 16 has an input coupled to the output of register 14 and an output. Shifter 16 provides a shift of one to the left so that its output is shifted one bit to the left from its input. Programmable shifter 18 has an input coupled to the output of counter 12 and an output. Shifter simply shifts a one to the left by the amount indicated by the counter 12 with the one originally located at the least significant bit, which is the location immediately to the left of the decimal point. Thus the output of shifter 18 is a logic "one" at the bit located to the left of least significant bit by the amount of the output of counter 12. Summer 20 has a first input coupled to the output of shifter 16, a second input coupled to the output of shifter 18, and output that is a sum of the values at its first and second inputs. Programmable shifter 22 has a first input coupled to the output of summer 20, a second input coupled to the output of counter 12, and an output. Summer 24 has a first input, a second input coupled to the output of shifter 22, and an output that is a sum of the values at its inputs. Comparator 26 has an X input coupled to the output of the summer 24, a Y input for receiving the square value, and an output coupled to the first input of register 14. Only the integer portion of the output of summer 24 is received by comparator 26. The output is a logic one if the value at the X input is less than or equal to the value at the Y input, and otherwise the output is a logic zero. Mux 28 has a first input coupled to the output of summer 24, a second input coupled to the output of register 30, a third input coupled to the output of comparator 26, and an output. Mux switches the value at its first input to its output if the third input is at a logic one and the value at its second input to its output if the third input is a logic zero. Register 30 has a first input coupled to the output of mux 28, a second input for receiving the clock, a third input coupled to the output of the control logic, and an output coupled to the first input of summer 24.

In operation control logic 11 begins the process of finding the square root of the number, called the square value, at the Y input of comparator 26 by resetting counter 12 and registers 14 and 30. Registers 14 and 30 are cleared so they contain all zeros. Counter 12 is set to the value of the bits of resolution minus one. In this embodiment the resolution is set to 16 bits and the square value is limited to 32 bits, but any values could be chosen. With 16 bits, all for integers in this case, counter 12 is set at the number 15. Programmable shifter 18 outputs a logic one at its $15^{th}$ bit using the standard 0-15 nomenclature (0 is the least significant bit (LSB), and 15 is the most significant bit (MSB)) for defining bit locations, which is the $16^{th}$ bit to the left of the decimal point, as selected by counter 12. Thus the value that is output by programmable shifter 18 is 2 to the $15^{th}$. Register 14 begins by outputting all zeros because it was cleared at the beginning of the process. Shifter 16 also outputs a zero because all of its inputs are at zero so the values to be summed by summer 20 are zero and 2 to the $15^{th}$ with the resulting output being 2 to the $15^{th}$. Programmable shifter 22 shifts its input by the amount of the output of counter 12, which is 2 to the $15^{th}$ shifted by 15, with the result that shifter 22 outputs a single one at the $30^{th}$ bit location and the rest zeros, which has the value of 2 to the $30^{th}$. Register 30 begins with the value of zero because it was cleared by control logic 11. Thus, summer 24 has at its inputs zero and 2 to the $30^{th}$ with the result of outputting 2 to the $30^{th}$. Comparator 26 compares 2 to the $30^{th}$ with the square value, which has a maximum value of 2 to the $32^{nd}$ minus 1. If the square value is equal or larger, then comparator 26 outputs a logic one which is received by register 14 at its first input and mux 28 couples the output of summer 24 to the first input of register 30. In such a case, this indicates that the ultimate answer to the square root of the square value will have a one in the most significant bit location, which is location 15 in this example. If on the other hand, the square value is less than 2 to the $30^{th}$, then comparator 26 outputs a logic zero to the first input of register 14 and the third input of mux 28. Mux 28 in such case outputs the output of register 30 to the first input of register 30. This completes the first iteration. The next step is for the clock to indicate the beginning of the next step and the loading into registers 14 and 30 the result of the iteration just completed. In the case of register 14, the logic state on its first input is entered into location 15, the most significant bit location.

The second iteration begins by decrementing counter 12 so that counter 12 outputs fifteen minus 1, which equals fourteen. The output of counter 12 indicates the particular bit location that is being calculated in the result ultimately provided at the output of register 14. With fourteen being received by programmable shifter 18, the $14^{th}$ bit location is set to a one so that the value of the output of programmable buffer is 2 to the $14^{th}$. Register 14 outputs its value to shifter 16. Assuming that the previous iteration resulted in a one in the $15^{th}$ bit location of register 14, shifter 16 shifts this one location to the left by one to the $16^{th}$ bit location. Thus the value of the 2 to the $15^{th}$ provided by register 14 is doubled to the value of 2 to the $16^{th}$ by shifter 16. Thus summer 20 has at its input the values of 2 to the $14^{th}$ plus 2 to the $16^{th}$ and provides that as an output to shifter 22. Shifter 22 provides a left shift of fourteen with the result of providing an output of a value of 2 to the $30^{th}$ plus 2 to the $28^{th}$. The output of register 30 is 2 the $30^{th}$, which is the value coupled to it by mux 28 from the immediately preceding iteration. Thus, summer 24 sums 2 to the $30^{th}$ plus 2 to the $30^{th}$ plus 2 to the $28^{th}$ and provides that to input X of comparator 26. Comparator 26 then determines if the square value is greater than or equal to the value of the X input. This determines if a zero or a one is loaded into the $14^{th}$ bit position in register 14 and thereby also determines if the final result has a zero or a one in its $14^{th}$ bit location.

This second described iteration is a comparison of the square value to the square of 2 to the $15^{th}$ plus 2 to the $14^{th}$. The calculation of that square is 2 to the $30^{th}$ plus 2 times 2 to the $14^{th}$ times 2 to the $15^{th}$ plus 2 to the $28^{th}$. The expression 2 times 2 to the $14^{th}$ times 2 to the $15^{th}$ is equal to 2 times 2 to the $29^{th}$, which in turn is equal to 2 to the $30^{th}$. The resulting expression for the desired square is 2 times 2 to the $30^{th}$ plus 2 to the $28^{th}$, which is the value applied to input X of comparator 26.

Each iteration is a comparison of a calculated value stored in register 30 to the square value.

When comparator input X is less than or equal to the square value, the contents of register 30 can be expressed as $$b_i = a_i^2 = (a_{i+1} + 2^i)^2$$

where $b_i$ is the new contents of register 30, $a_i$ is the new contents of register 14, $a_{i+1}$ is the previous contents of register 14 and i is the value of counter 12. From the operational viewpoint the contents of register 30 can be obtained as $$b_i = b_{i+1} + 2 * 2^i a_{i+1} + 2^{2i}$$

where $b_{i+1}$ is the previous value of register 30.

In other words the new contents of register 30 are equivalent to the previous value plus 2 times 2 to the current value of counter 12 times the previous value of register 14 (coming from shifter 16 and shifter 22) plus 2 to 2 times the current value of counter 12 (coming from shifter 18 and shifter 22).

The arithmetic function that is being performed by the iterative process is the square root. The inverse of that operation is the square function. At any time in the iterative process there is a current estimate stored in register 14 and the determination that is in progress is to determine if the next bit, in descending order of significance, is a one or a zero. The operation is achieved by using the square function but not by simply using a multiplier that multiplies the next estimate by itself. Rather the square of the current estimate is stored in register 30 and added to an incremental value. The incremental value is the value, that if added to the square of the current value, will be the square of the estimated value that is in progress, which is the current value plus a one in the next bit. For example, if iterations for the five most significant bits have already been performed, then the next bit added is the sixth most significant bit. In this case incremental value is the value of the next bit, which is 2 to the value of the counter, squared plus two times the current estimate times the value of the next bit. This incremental value is added to the current value by summer 24. The output of summer 24 is then compared to the square value by comparator 26.

Figure 2:
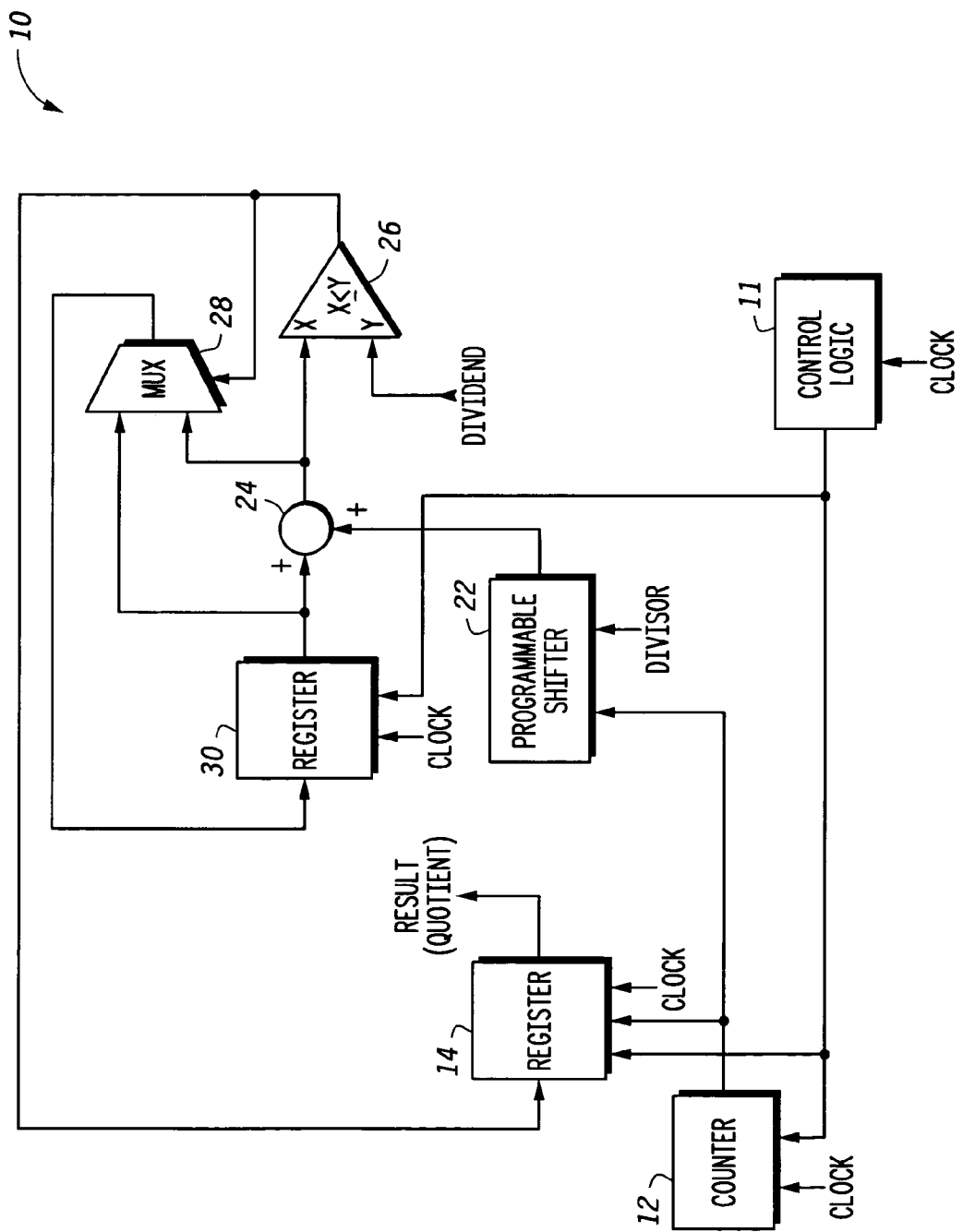
FIG. 2 is a block diagram of a circuit according to an alternative embodiment of the invention.

A similar process can be used for division. In division a quotient is determined from a divisor being divided into a dividend. The apparatus shown in FIG. 1 can be used to achieve a division function except that the divisor is input into shifter 22 instead of the output of shifter 16, that the dividend is input into comparator 26 instead of the square value, and that shifters 16 and 18 and summer 20 are not used. The resulting circuit is shown in FIG. 2 with the same numerals indicating the same structure as in the circuit of FIG. 1.

In this case a first iteration is to see if a one is present in the MSB for the quotient, which is the result being calculated in this case of division. The output of shifter 22 is the divisor shifted by the amount output by counter 12. The result is a value of the divisor times 2 to the count of the counter. In this example, a 16 bit resolution is used for result stored in register 14 so that the counter output is 15, which causes shifter 22 to perform a left shift of 15. The effect is that the output of shifter 22 is the divisor times 2 to the $15^{th}$. Summer 24 adds the value stored in register 30 to the output of shifter 22 and this sum is compared to the dividend. If the X input exceeds the dividend the MSB of the result is a zero for the MSB, a zero is reloaded into register 30, and an iteration for the next bit is begun. On the other hand, if the output of summer 24 is less than or equal to the dividend, the MSB of register 14 is set to a one, and the output of summer 24 is loaded into register 30 by mux 28. If the output of summer 24 was less than the dividend, the process continues with counter 12 decrementing to 14. At this point, register 30 has stored therein the value of the current estimate of the quotient times the divisor. The arithmetic function being performed is division by the divisor so the inverse of that function is multiplication by the divisor. Thus, register 30 has stored therein a value representative of the inverse function of the current estimate.

For the next iteration and counter 12 decremented to 14, shifter 22 shifts the divisor by 14 to the left. This has the effect of multiplying the divisor by 2 to the $14^{th}$. The bit being calculated is for this same $14^{th}$ bit in the result which has that same value of 2 to the $14^{th}$. The result is that the output of shifter 22 added to the output of register 30 is the inverse function of the current estimate plus the incremental value to the inverse function caused by adding the next iteration value, which is 2 to the $14^{th}$ in this case. Thus the output of summer 24 is the total value of the estimate being calculated times the divisor. This is achieved without a multiplier circuit. The output of summer 20 is compared to the dividend by comparator 26. If the comparison indicates the dividend is equal or higher, then the bit under calculation, bit 14 in this example iteration, is set to a one and the output of summer 24 is loaded into register 30 through mux 28. If the dividend is equal to the output of summer 24, then the iteration of the next bit doesn't have to continue, but in practice it is likely to make no difference because the time allotted for the calculation is set by the resolution required. If the dividend is lower, then the bit under calculation is set to a zero and the output of register 30 is reloaded into register 30. The process continues by decrementing the counter until either the dividend matches the output of summer 24 or all of the bits for the result have been calculated.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A high speed circuit for performing an arithmetic function comprising one of a group consisting of division and square root applied to a number and provide a result of the arithmetic function based on partial iterations, comprising:
    a counter for providing a count to identify a current partial iteration;
    a comparator having a first input for receiving the number, a second input, and an output;
    register means for storing a current estimate of the result of the arithmetic function as applied to the number based on previous partial iterations, for providing an output representative of a next partial iteration, and for updating the result based on the output of the comparator, wherein the register means has a first input coupled to the output of the comparator, a second input coupled to the counter, and an output;
    storage means for storing an inverse of the arithmetic function of the current estimate and having an output on which is provided the inverse of the arithmetic function of the current estimate of the result;
    incremental means having an input coupled to the output of the register means for providing, on an output, an incremental effect, wherein the incremental effect is a value that when added to the inverse of the mathematical function of the current estimate is equal to the inverse function of a next current estimate plus the next partial iteration; and
    summing means, having an output coupled to the second input of the comparator, a first input coupled to the output of the storage means, a second input coupled to the incremental means, for providing on the output a sum of the incremental effect and the inverse of the arithmetic function of the current estimate.

2. The circuit of claim 1, wherein the arithmetic function is division by a divisor.

3. The circuit of claim 2, wherein the incremental means comprises:
    a programmable shifter having a first input for receiving the divisor, a second input for receiving a signal indicating a shift amount, and an output coupled to the summing means.

* * * * *